United States Patent [19]
Imase et al.

[11] Patent Number: 6,023,989
[45] Date of Patent: Feb. 15, 2000

[54] TRANSMISSION DEVICE FOR CONVERTING A TORQUE BETWEEN ROTARY MOVEMENT AND LINEAR MOVEMENT

[75] Inventors: Kenji Imase, Aichi; Hiroshi Makino; Hidetsugu Terada, both of Yamanashi, all of Japan

[73] Assignee: Kamoseiko Kabushiki Kaisha, Aichi, Japan

[21] Appl. No.: 08/993,707

[22] Filed: Dec. 18, 1997

[30] Foreign Application Priority Data

Dec. 25, 1996 [JP] Japan ..................................... 8-346337

[51] Int. Cl.⁷ ........................................................ F16H 1/04
[52] U.S. Cl. .................................. 74/422; 74/462; 74/465; 74/457
[58] Field of Search ..................................... 74/422, 89.17, 74/89.18, 89.19, 462, 465, 457

[56] References Cited

U.S. PATENT DOCUMENTS

| | | | |
|---|---|---|---|
| 2,750,807 | 6/1956 | Miyazaki | 74/157 |
| 3,581,666 | 6/1971 | Bertin | 104/23.2 |
| 3,633,433 | 1/1972 | Schurch | 74/415 |
| 3,636,791 | 1/1972 | Barr | 74/422 |
| 3,881,365 | 5/1975 | Hardy | 74/462 |
| 4,879,920 | 11/1989 | Kerkhoff | 74/465 |
| 4,998,442 | 3/1991 | Brown et al. | 74/89.17 |
| 5,247,847 | 9/1993 | Gu | 74/465 |
| 5,341,699 | 8/1994 | Rouverol | 74/462 |
| 5,485,761 | 1/1996 | Rouveral | 74/462 |
| 5,540,111 | 7/1996 | Barnett et al. | 74/30 |

FOREIGN PATENT DOCUMENTS

| | | |
|---|---|---|
| 352940 | 5/1922 | Germany . |
| 662419 | 7/1938 | Germany . |
| 195 17 345 | 11/1995 | Germany . |
| 564 999 | 8/1975 | Switzerland . |
| 2 296 751 | 7/1996 | United Kingdom . |
| 92/21897 | 12/1992 | WIPO . |

*Primary Examiner*—Tamara L. Graysay
*Assistant Examiner*—David Fenstermacher
*Attorney, Agent, or Firm*—Sughrue, Mion, Zinn Macpeak & Seas PLLC

[57] ABSTRACT

A transmission device for converting a torque from rotary to linear movement includes a rack having a plurality of teeth and a pinion having rollers which mesh with the teeth of the rack, with pressurization provided therebetween. The rack has an arcuate tooth flank diametrically greater than each of the rollers of the pinion. The rack also has a tooth face which has an approach profile progressively moving away from the path of contact of each of the rollers along which each of the rollers would otherwise engage with the tooth face. A plurality of each of the rollers of the pinion concurrently mesh with the corresponding teeth of the rack. Another embodiment converts a torque between rotary and linear movement and comprises a pinion having a plurality of teeth and a rack having a plurality of rollers to mesh with the teeth of the pinion. The device achieves reduced transmission resistance, a silent intermeshing movement with no substantial noise and vibration, as well as reduced wear on the teeth and rollers.

9 Claims, 19 Drawing Sheets path of roller (trochoidal curve)

cycloidal curve
trochoidal curve path of roller (modified involute curve)

US 6,023,989

TRANSMISSION DEVICE FOR CONVERTING A TORQUE BETWEEN ROTARY MOVEMENT AND LINEAR MOVEMENT

BACKGROUND OF THE INVENTION

1. Field of the Invention

The invention relates to a transmission device for converting a torque from a linear movement to a rotary movement and vice versa.

2. Description of the Prior Art

As one example of this type of transmission device, a rack and pinion type transmission has been introduced in which the pinion intermeshes with the rack. In general, both the rack and pinion have a tooth profile created based on an involute curve principle.

As shown in FIG. 18, pressurization is provided to force a tooth J4 of a pinion J3 driven between teeth J2 and J2 of a rack J1, and thus produce a greater friction between the teeth so as to remarkably reduce torque transmission efficiency.

In order to avoid deterioration of the transmission efficiency, there has been provided a backlash between the teeth J2 and J4 when designing the toothed gear as shown in FIG. 19. The backlash, however, makes the tooth J2 mesh with the tooth J4 intermittently, thus causing noise and unfavorable vibration. It also causes rattling when the tooth J4 reversely meshes with the tooth J2 at the time of moving in another direction.

In an aim to obviate the aforementioned inconvenience, it has been conceived that the teeth J4 of the pinion J3 are replaced by rollers J5 and the teeth of the rack are created based on the cycloidal curve so as to form a rack and pinion structure as shown in FIG. 20.

In this type of rack and pinion structure, the roller J5 rollingly meshes with the rack J1 so as to reduce the transmitting resistance between the roller J5 and the rack J1. The structure allows meshing of a plurality of the rollers J5 with the corresponding teeth J2 of the rack J1 to provide a continuous rotational movement without generating the rattling when reversely meshing the teeth J2.

However, when the roller J5 reaches a proximal surface J6 between the neighboring teeth J2 of the rack J1, a radius of curvature of the central path of the roller J5 comes to zero. In order to cope with the situation, it is necessary to provide an undercut (A) as shown by a hatched area in FIG. 21. The undercut (A) does not pose a problem as long as it is applied to a transmission device which requires not so high a precision. However, it poses a problem with a transmission device which requires a high precision since the roller J5 is located away from the tooth J2 of the rack J1 at the undercut area (A), thus rendering the roller J5 unable to normally trace the cycloidal path so as to transitionally suspend the torque transmission. That is, the undercut (A) causes the roller to be in mesh and out of mesh alternately with the tooth of rack to generate the noise and vibration so as to affect on the service life.

As mentioned above, when the roller J5 reaches the proximal surface J6 between the neighboring teeth J2 of the rack J1, a radius of curvature of the central path of the roller J5 comes to zero because the radius of the roller J5 corresponds with that of the proximal surface J6. This makes half of the roller J5 inscribe substantially with the proximal surface J6 so as to render the roller J5 unable to rotationally move when the roller J5 reaches the proximal surface J6.

During the above process in which the roller J5 rolls and collides on the proximal surface J6 to temporarily suspend its rolling action, noise and vibration may be generated.

It is all the more true when pressurization is provided between the rack J1 and pinion J3 to eliminate the backlash so as to attain a high rigidity therebetween.

With the undercut (A) generated by the teeth J2 of the rack J1 whose profile is created based on the cycloidal curve, it is difficult to always mesh the corresponding rollers J5 concurrently with a plurality of the teeth J2 of the rack J1 when the number of the rollers is limited. This produces backlash when the pinion J3 meshes with the rack J1, and the rack J1 reversely meshes with the pinion J3. This has been entirely ignored so far.

In order to eliminate the backlash between the tooth J2 and the roller J5, it has been conceived to applied the pressurization between the rack J1 and the pinion J3. The pressurization, thus provided, gives mechanical stress from the roller J5 to the tooth J2 to obviate an initial strain of the component parts so as to advantageously enhance the rigidity between the rack J1 and the pinion J3.

With an aim to theoretically provide a smooth rolling contact torque transmission, the cycloid-based tooth profile is tantamount to a sum of a radius of the roller J5 and a path in which the central point of the roller J5 draws when the pinion J3 rolls along a predetermined plane.

However, when pressurization is provided between the rack J1 and the pinion J3, the roller J5 collides on and is released from a pressurized component (Po) at the time of beginning to mesh the roller J5 with and disengage it from the tooth J2 of the rack J1 so as to generate noise and vibration as shown in FIG. 23. This also causes wear on the roller J5 and the tooth J2 so as to influence the service life.

Therefore, it is a main object of the present invention to provide a torque transmission device which is capable of suppressing noise and vibration with a minimum transmission resistance while insuring a continuous transmission with a high rigidity while no rattling is produced when moving in a normal and reverse direction.

SUMMARY OF THE PRESENT INVENTION

According to the present invention, there is provided a torque transmission device including a rack having a plurality of teeth and a pinion having corresponding intermeshing elements comprising rollers to mesh with the teeth of the rack respectively with pressurization provided therebetween, the torque transmission device comprising: the intermeshing elements being rollers rotationally provided on the pinion by means of a bearings the teeth of the rack having an arcuate tooth flank diametrically greater somewhat than the teeth of the roller of the pinion; the rack having a tooth face which has an approach profile progressively moving away from a the path of contact of the roller along which the roller would otherwise engage with the tooth face; and a plurality of rollers of the pinion which concurrently mesh with the corresponding teeth of the rack.

According to still another aspect of the present invention, there is provided a torque transmission device including a pinion having a plurality of teeth and a rack having corresponding intermeshing elements comprising rollers to mesh with the teeth of the pinion respectively with pressurization provided therebetween, the torque transmission device comprising: the intermeshing elements being rollers rotationally provided on the rack by means of a bearings; the teeth of the pinion having an arcuate tooth flank diametrically greater somewhat than the roller of the rack; the teeth of the pinion having a tooth face which has an approach profile progressively remote from the path of contact of the roller along which the roller would otherwise engage with the tooth face; and a plurality of rollers of the rack which concurrently mesh with the corresponding teeth of on the pinion.

According to yet another aspect of the present invention, the roller is in the shape of ellipsoid in which a middle portion is diametrically larger than both ends of the roller.

According to still another aspect of the present invention, each of the teeth has a concave-shaped crowning surface in a face width direction, the crowning surface having a radius of curvature greater than that of the ellipsoidal roller.

According to another aspect of the present invention, each of the teeth has a convex-shaped crowning surface in a face width direction in which a middle portion is diametrically larger than both ends of the roller.

According to another aspect of the present invention, the roller is in the shape of a hyperboloid in which a middle portion is diametrically smaller than both ends of the roller, and the roller has a radius of curvature greater than that of the convex-shaped crowning surface.

With the intermeshing element comprising a roller brought in mesh with the tooth of the rack, pressurization provided between the rack and pinion, it is possible to eliminate the backlash so that the roller can rollingly move along the surface of the tooth of the rack to significantly reduce the transmission resistance. With a plurality of the rollers concurrently in mesh with the corresponding teeth of the rack, it is possible to transmit the torque continuously with no rattling produced when rotationally moving in one direction and another. Even when the rolling contact pressure varies due to the fluctuation of the transmission torque, the pressurization makes it possible to eliminate the initial strain of the component parts and the transmission torque fluctuation while insuring a stable torque transmission with a high rigidity.

With the proximal surface between the neighboring teeth of the rack shaped into an arcuate configuration whose diameter is somewhat greater than that of the roller, it is possible to maintain the rolling contact with the tooth of the rack at all times without suspending the roller at the proximal surface. This insures a silent intermeshing movement with no substantial noise and vibration produced due to the roller being suspended at the proximal surface.

Further, with the arcuate proximal surface between the neighboring teeth of the rack, it is possible to reduce an amount of the undercut so as to mesh a plurality of rollers concurrently with the teeth of the rack even when the number of the rollers is limited.

With the approach profile provided on the tooth face of the rack in the manner to progressively move away from the path of the roller, when the roller begins to mesh with the tooth of the rack, it changes the pressurization to gradually strengthen so as to smoothly mesh the roller with the tooth of the rack. When the roller begins to disengage from the tooth of the rack, it changes the pressurization to slowly weaken so as to smoothly release the roller from the rack.

As a result, it is possible to insure the silent intermeshing action with no substantial noise and vibration produced due to the roller colliding on and being released from the pressurized component beginning to mesh the roller with and disengage it from the tooth of the rack. This also reduces the wear on the roller and the tooth so as to contribute to an extended service life.

It is acceptable to replace the rollers of the pinion by the teeth of the rack, and at the same time, replacing the teeth of the rack by the rollers of the pinion. In this instance, it is possible to obtain the same advantages as secured by the above structure.

With the roller formed into the ellipsoidal configuration and the tooth crowned in the face width direction, it is possible to achieve a gradient between the tooth and the roller. However, it is possible to smoothly mesh the roller with the tooth so as to maintain a silent intermeshing movement regardless of the gradient achieved between the tooth and the roller.

BRIEF DESCRIPTION THE DRAWINGS

DETAILED DESCRIPTION THE PREFERRED EMBODIMENTS

Figure 1:
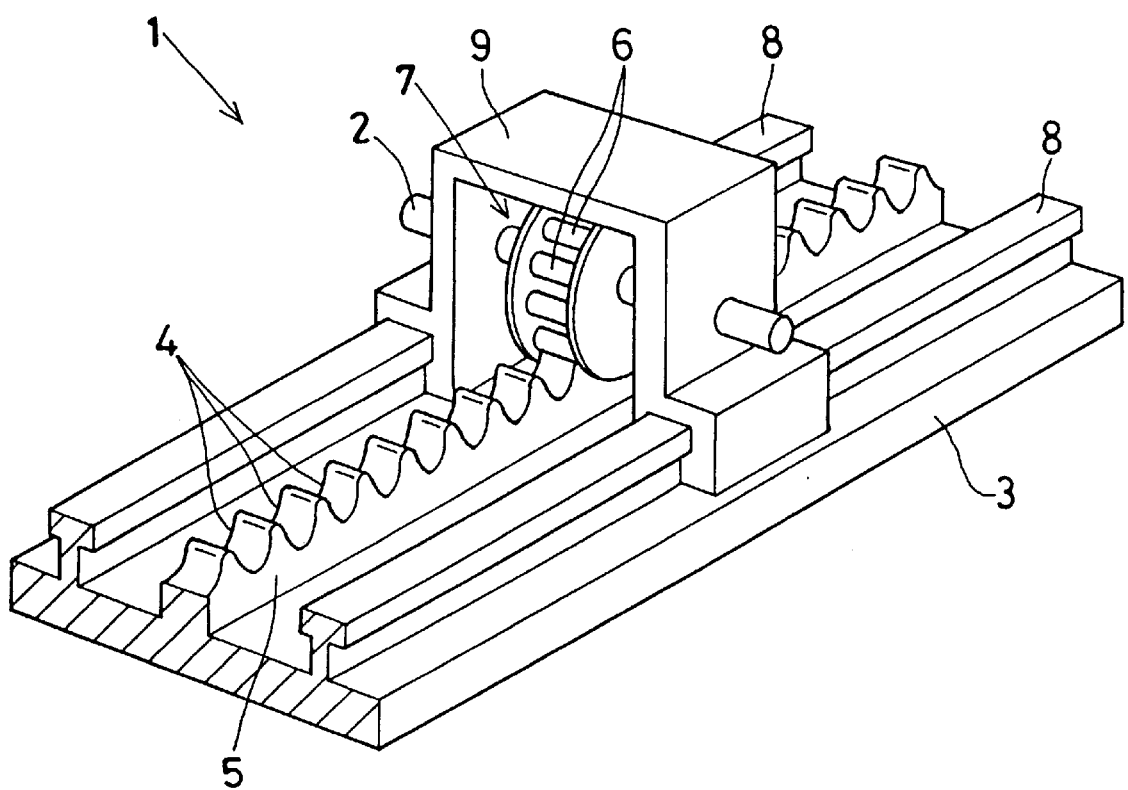
FIG. 1 is a perspective view of a torque transmission device according to a first embodiment of the invention.

Referring to FIGS. 1~8 which shows a torque transmission device according to a first embodiment of the invention, the torque transmission device 1 is created based on the rack and pinion combination to apply to an apparatus which requires a high precision, high torque transmission with high efficiency and durability such as a transfer machine, industrial robot, machine tool, precision machine. The torque transmission device 1 is adapted to receive a rotary movement from an input shaft 2 to drive a base table 3 in a horizontal direction.

The torque transmission device 1 has a rack 5 having a plurality of teeth 4 and a pinion 7 in which rollers 6 (e.g., 10) are provided to mesh with the teeth 4 of the rack 5 so as to rotationally move the pinion 7 in unison with the input shaft 2. With the rotary movement of the pinion 7, the rack 5 is slidingly driven in unison with the base table 3.

Between the rack 5 and the pinion 7, there is provided a constant pressurization which always pushes the pinion 7 toward the rack 5. In order to provide the pressurization, two ways have been so far introduced. One is a constant pressure method in which a spring is used to always urge the pinion 7 toward the rack 5. The other is a constant position method in which a predetermined pressure is applied to the rack 5 and the pinion 7 to previously compress them when meshing the pinion 7 with the rack 5. In the embodiment of the present invention, the latter method is adopted.

In adopting the constant position method, a pair of rails 8 is provided to horizontally extend along the rack with the rack 5 interposed between the rails 8. Lower leg portions of a frame-like saddle 9 are hooked to the corresponding rails 8 so that the saddle can slidably move along the rails 8. Within the frame-like saddle 9, the pinion 7 is provided to rotationally move around the input shaft 2. The saddle 9 pushes the pinion 7 against the rack 5 to forcibly mesh the pinion 7 with the rack 5. The saddle 9 is fixed to a stationary member (not shown) to slidingly move the rack 5 in unison with the base table 3. Instead of moving the base table 3, the pinion 7 and the saddle 9 may slidingly be driven by fixing the base table 3. Instead of rotating the input shaft 2, the base table 3 may slidingly be driven with the saddle 9 firmly fixed so as to transform the linear movement to the rotary movement.

Figure 2:
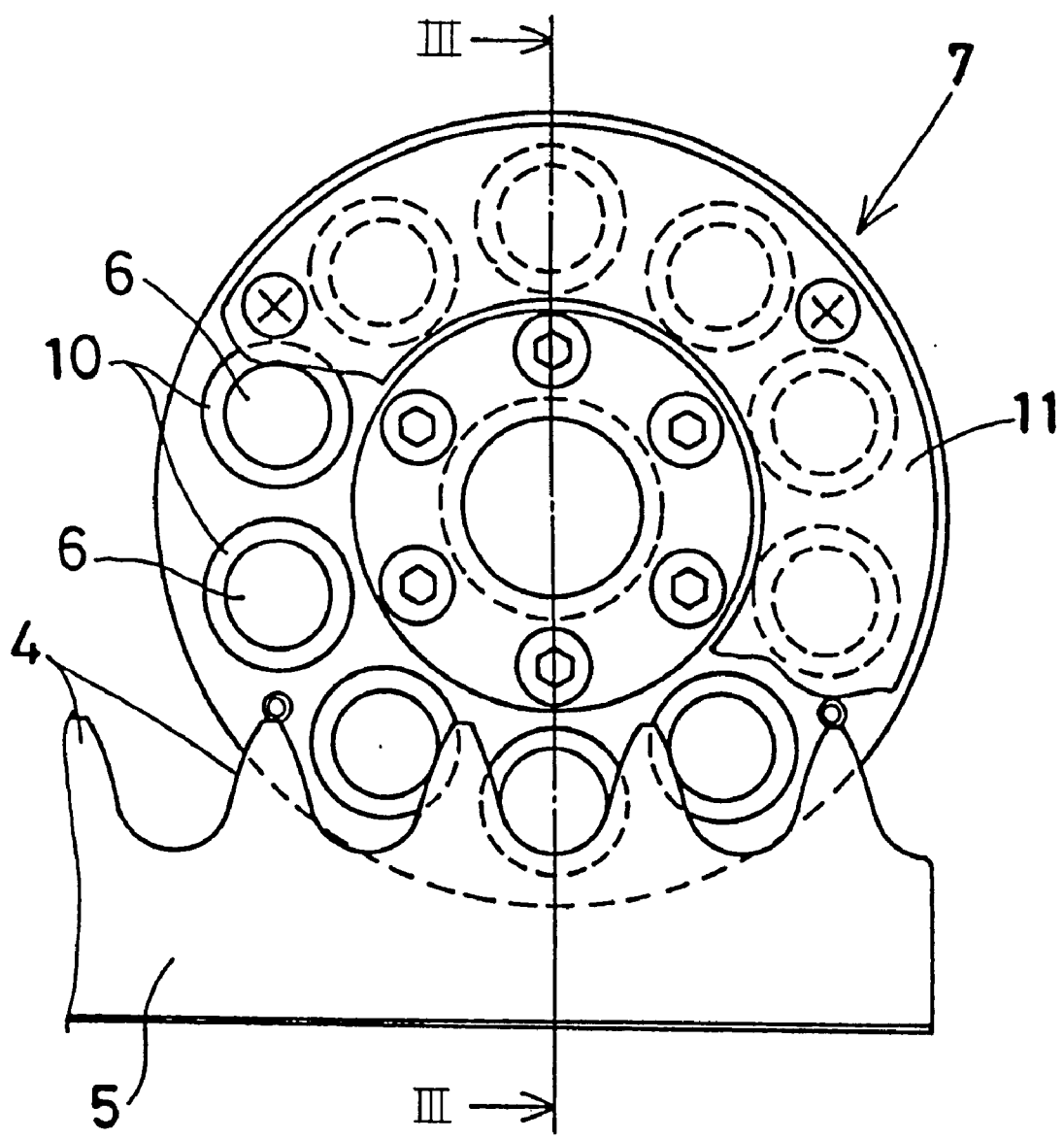
FIG. 2 is a side elevational view of a main portion of the torque transmission device.

The rack 5 is created based on the common trochoidal curve, a tooth profile of which is described hereinafter. As shown in FIG. 2, the rollers 6 of the pinion 7 are rotationally supported on a pair of annular plates 11 of the pinion 7 by means of a bearing 10. A plurality of rollers 6 is adapted to mesh concurrently with the corresponding teeth 4 of the rack 5.

Figure 3:
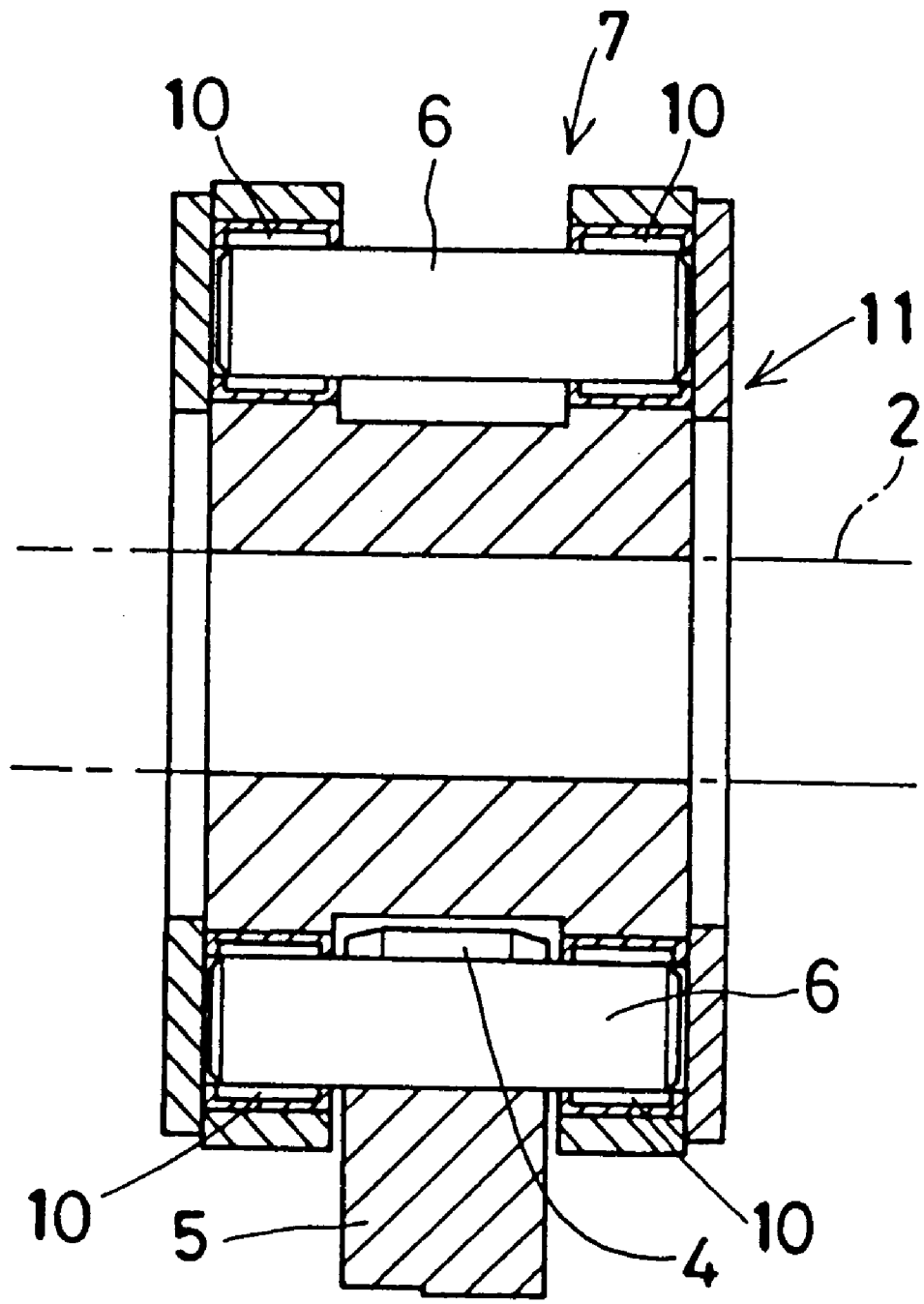
FIG. 3 is a longitudinal cross sectional view taken along the line III—III of FIG. 2.

As shown in FIGS. 2 and 3, the pinion 7 has a plurality of rollers 6 circumferentially arranged to be supported by the annular plates 11. The rollers 6 are positioned in parallel with each other at regular intervals in the circumferential direction. The annular plates 11 have pluralistic component parts and are fixed to the input shaft 2 through a central portion thereof.

Figure 4:
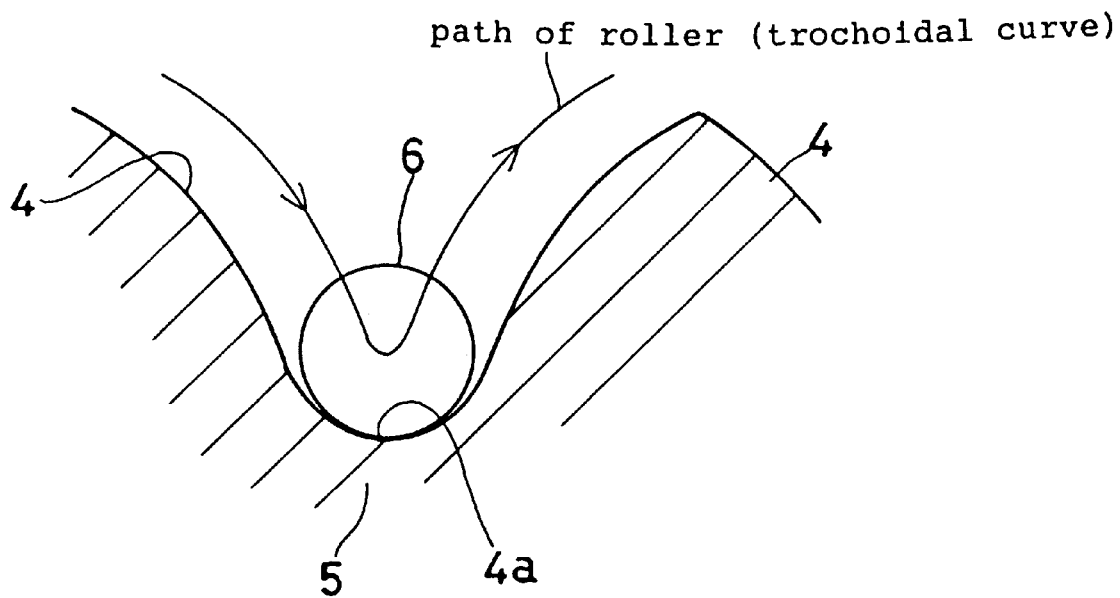
FIGS. 4 and 5 are explanatory views of an intermeshing portion between a roller and a tooth.
Figure 5:
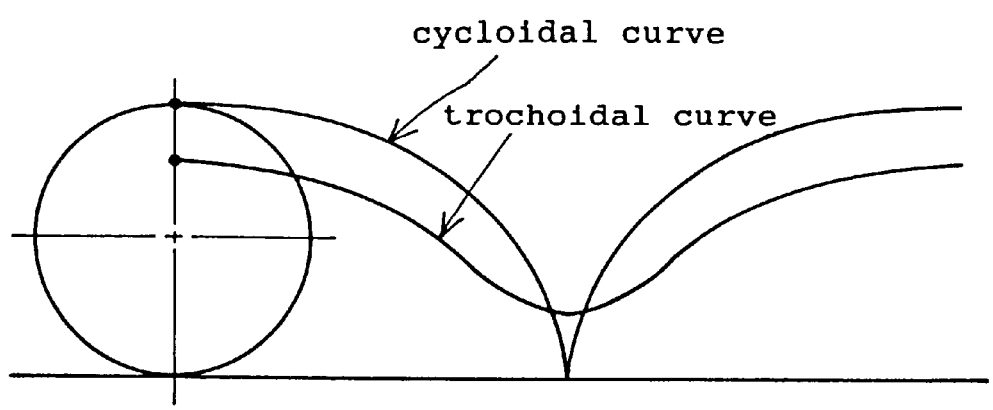

Upon creating teeth 4 of the rack 5 based on the common trochoidal curve, a proximal surface 4a between the neighboring teeth 4 is formed into an arcuate configuration. A radius of the proximal surface 4a is greater than that of the roller 6 so that the roller 6 can maintain the rolling contact when meshed with the teeth 4 of the rack 5. The common trochoidal curve is formed by a path drawn of an inner point of a circle roller as shown in FIG. 4. The tooth profile of the rack 5 forms a contour removed from the common trochoidal curve by the radius of the roller 6 as shown in FIG. 5. This is because a center of the roller 6 can trace the common trochoidal path when rolling along the teeth 4 of the rack 5.

Figure 6:
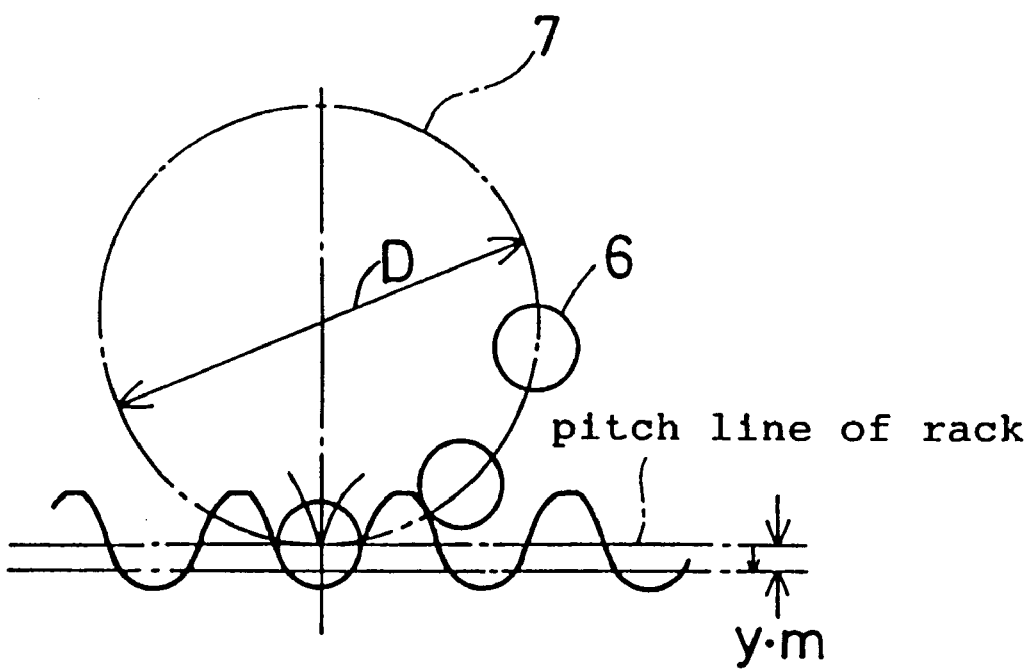
FIGS. 6 and 7 are explanatory views of how a tooth profile are created.

In detail, a pitch line of the rack 5 is shifted to be outside of the diameter (D) of the pinion 7 (positive profile shift) as shown in FIG. 6. An amount of the profile shift (y·m) is expressed by the product of an addendum modification coefficient (y) and a module (m=D/Z). In this instance, the profile shift means that a pitch circle of the pinion 7 is enlarged greater than the diameter(D) which is defined by the centers of the circumferentially arranged rollers 6.

Figure 7:
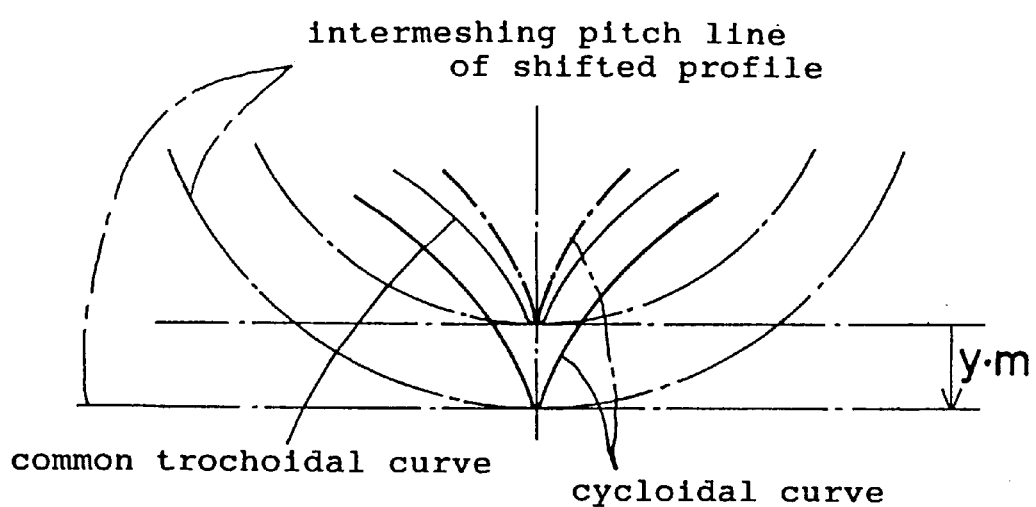

As shown in FIG. 7, the center of the roller 6 draws the common trochoidal curve which is the path drawn when an inner point of a circle rolls. The teeth 4 of the rack 5 are profiled by a contour removed from the common trochoidal curve by the radius of the roller 6.

With the procedures thus described, it is possible to set a valley of the trochoid-based contour diametrically larger than the roller 6 so as to provide the proximal surface 4a whose radius is greater than the radius of the roller 6 without forming the undercut.

Figure 8:
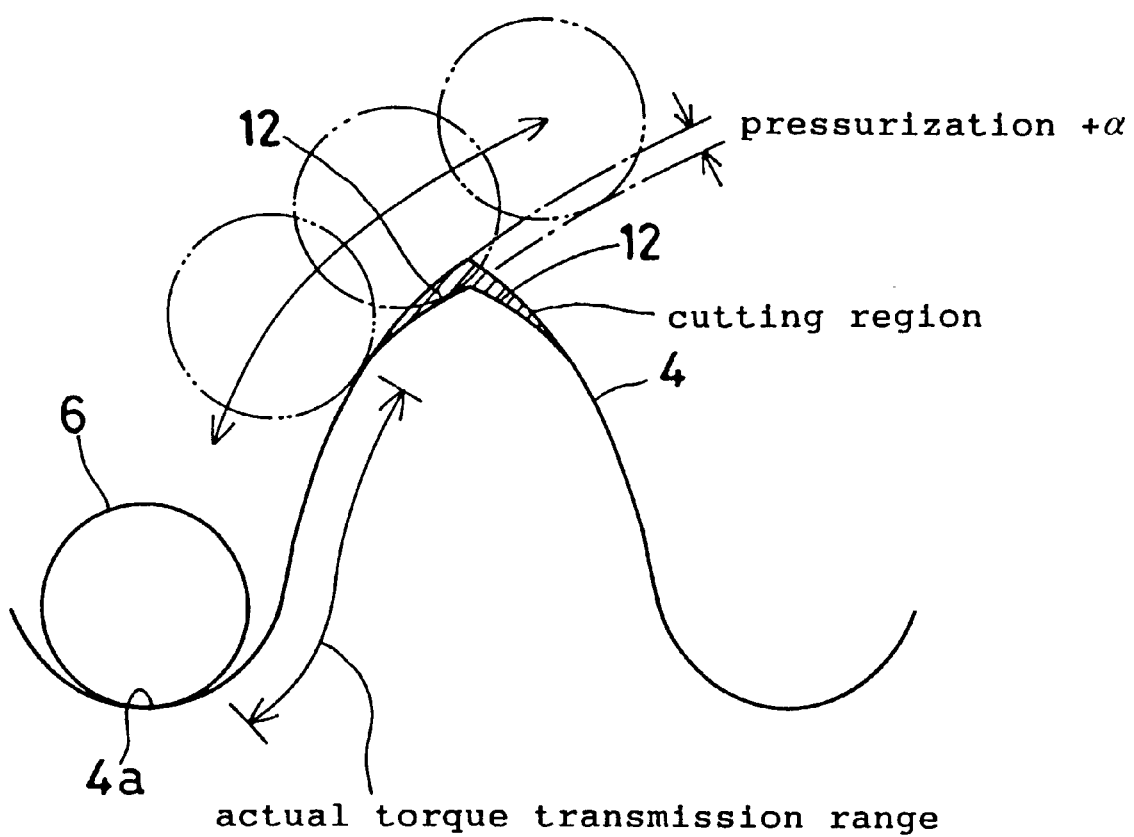
FIG. 8 is an explanatory view of a tooth face profile.
Figure 9:
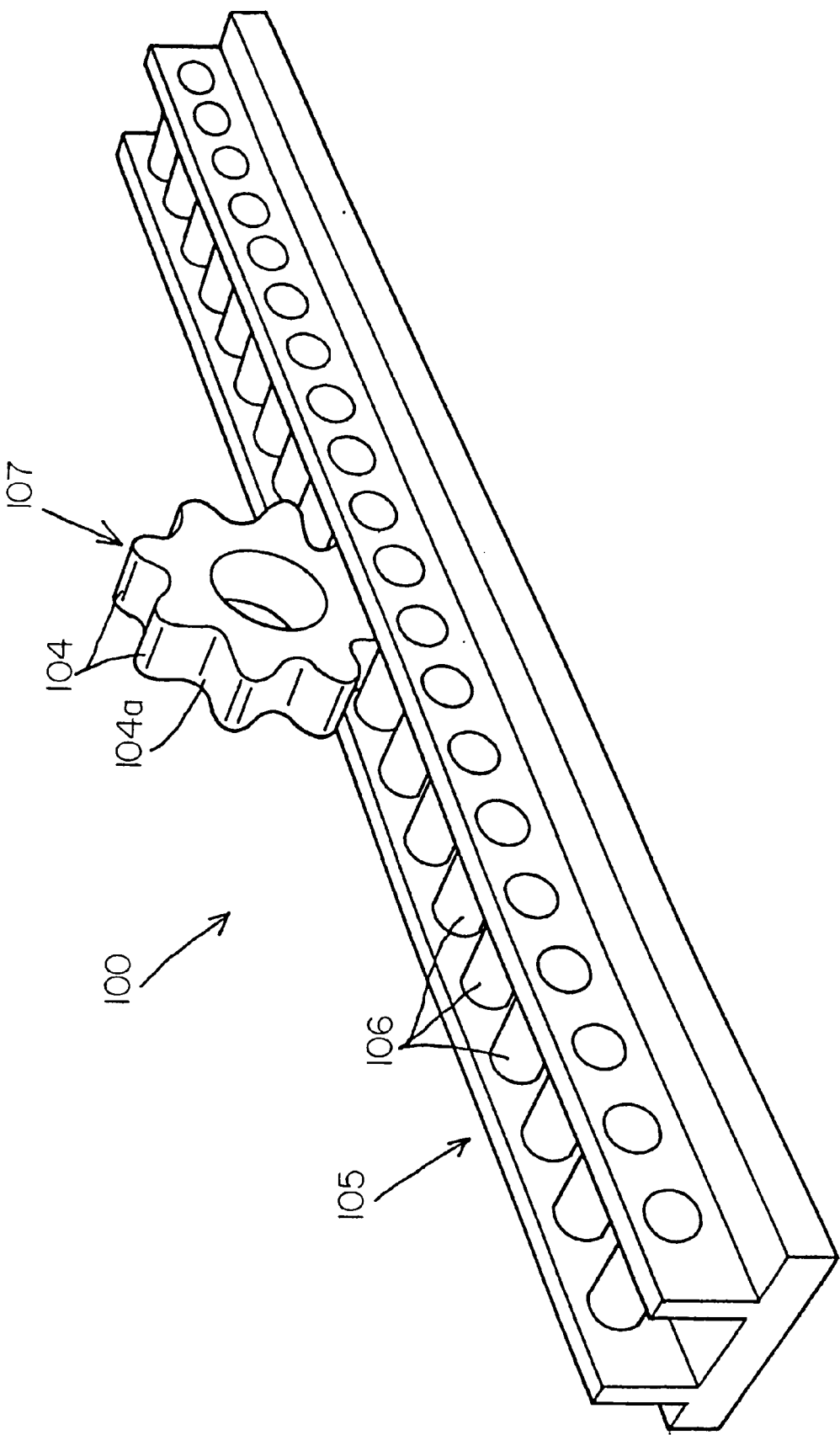
FIG. 9 is a perspective view of a torque transmission device according to a second embodiment of the invention.
Figure 10:
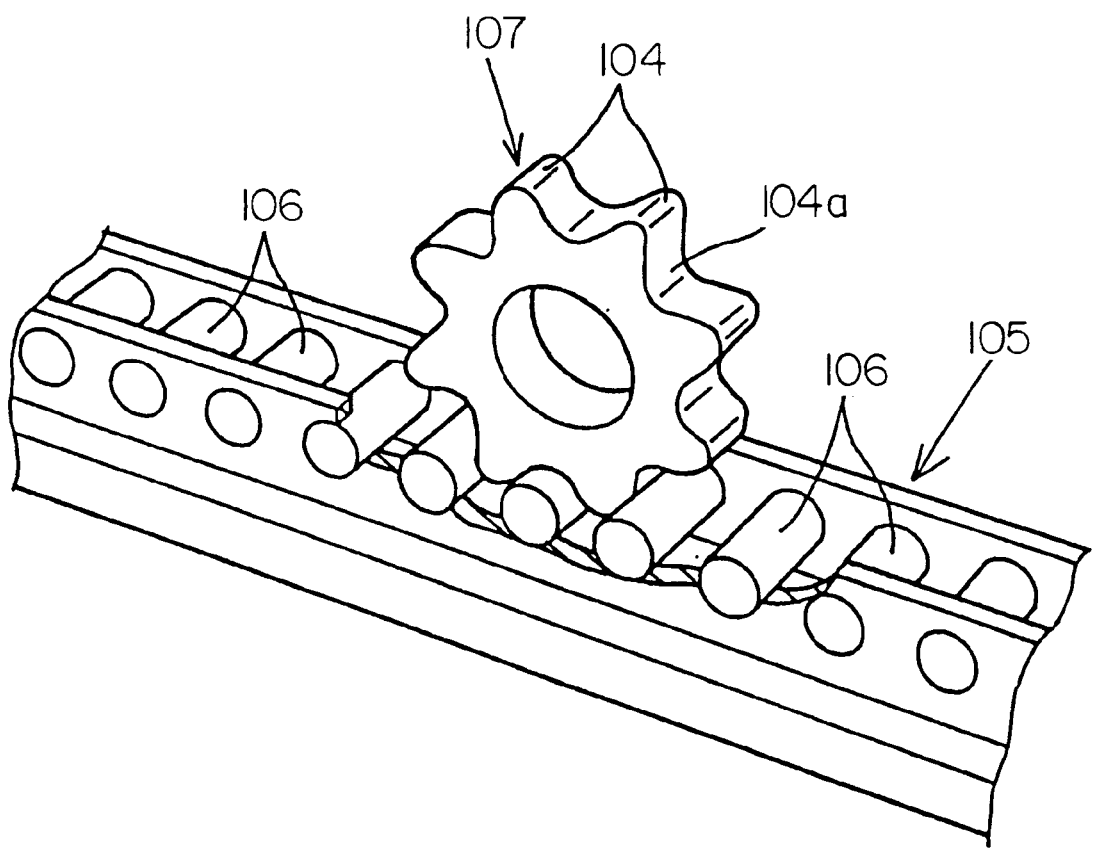
FIG. 10 is a perspective view of a torque transmission device from a different direction of FIG. 9.

As shown in FIG. 8, the tooth 4 of the rack 5 has a tooth face which has an arcuate approach profile 12 which progressively moves away from the path of contact of the roller 6 along which the roller 6 would otherwise engage with the tooth face. The approach profile 12 is provided by cutting the tooth face as depicted by a hatched area in FIG. 8. Instead of the arcuate approach profile 12, a linear approach profile may be provided.

Without the approach profile 12, the pressurization makes the roller 6 collide on the tooth face and rapidly release from the tooth face so as to generate noise and vibration each time when the roller 6 begins to mesh with and disengage from the tooth 4 of the rack 5. With the approach profile 12 provided on the tooth face to divert the pressurization, it is possible to smoothly mesh the roller 6 with and silently disengage from the tooth 4 of the rack 5.

In the rack 5 in which the tooth profile is created based on the trochoidal curve, it transitionally suspends the torque transmission when the roller 6 reaches the proximal surface 4a at the pressure angle (90°). The torque transmission is effectuated mainly in the region from the tooth flank to the tooth face. When the torque transmission is effectuated even at the tooth face, the tooth however forms an acute angle to reduce its circular thickness to significantly weaken the mechanical strength. Even in order to save this situation, the approach profile 12 makes the torque transmission ineffective at the tooth face when considered that another roller concurrently engages with the corresponding tooth to effectuate the torque transmission. In view of this, the tooth profile is created to have a stable mechanical strength so that the torque transmission is made effective mainly at the tooth flank as shown by a double headed arrow in FIG. 8.

As aforementioned, the tooth 4 of the rack 5 is created based on the trochoidal curve in which the proximal surface 4a is diametrically greater than the roller 6, and has the arcuate approach profile 12 progressively moves away from the path of contact of the roller 6 along which the roller 6 would otherwise engage with the tooth face. The tooth 4 can be readily formed with the use of the machine tool such as an NC type milling machine or the like.

With the structure thus far described, an electric motor (not shown) is energized to drive the input shaft 2 to rotationally move the pinion 7 in unison with the rollers 6 which intermeshes with the teeth 4 so as to linearly move the rack 5 in unison with the base table 3 in the horizontal direction. Instead of moving the base table 3, the pinion 7 and the saddle 9 may slidingly be driven by fixing the base table 3 to a stationary member. Instead of rotating the input shaft 2, the base table 3 may slidingly be driven with the saddle 9 firmly fixed so as to transform the linear movement to the rotary movement.

Advantages

With the pressurization provided between the rack 5 and the pinion 7, it is possible to eliminate the backlash, and reducing the transmission resistance because the roller 6 swiftly rolls along the tooth surface of the rack 5. Since a plurality of rollers 6 mesh concurrently with the corresponding teeth 4 of the rack 5, it is possible to insure a smooth intermeshing movement without generating the rattling when the pinion 7 reverses its rotational direction.

Even when the contact pressure varies due to the machining error, the fluctuation of the load and transmission torque, the pressurization eliminates the initial strain of the component parts while absorbing the fluctuation of the load and transmission torque so as to always attain a stable torque transmission. The pressurization maintains a favorable rigidity between the rack 5 and the pinion 7.

With the proximal surface 4a arcuated diametrically greater than the roller 6, it is possible to maintain the rolling contact with the tooth 4 of the rack 5 at all time, thus preventing the roller 6 from being suspended at the proximal surface 4a to achieve the silent intermeshing movement with no substantial rotational speed fluctuation, noise and vibration generated.

With the approach profile 12 provided on the tooth face of the rack 5 in the manner to progressively move away from the path of the roller 6, when the roller 6 begins to mesh with the tooth 4 of the rack 5, it changes the pressurization to gradually strengthen so as to smoothly mesh the roller 6 with the tooth 4 of the rack 5. When the roller 6 begins to disengage from the tooth 4 of the rack 5, it changes the pressurization to slowly weaken so as to swiftly release the roller 6 from the rack 5. As a result, it is possible to insure the silent intermeshing movement with no substantial noise and vibration produced due to the roller 6 colliding on and being released from the pressurized component at the time of beginning to mesh the roller 6 with and disengage it from the tooth 4 of the rack 5. This also reduces the wear on the roller 6 and the tooth 4 so as to contribute to an extended service life. The approach profile 12 helps maintain the tooth face obtuse so as to enhance its mechanical strength.

Referring then to FIGS. 9~12, the torque transmission device represented by numeral 100 is shown according to a second embodiment of the invention. In the second embodiment of the invention, the rollers 106 are provided on the rack 105, and the teeth 104 are provided on the pinion 107 as contrary to the first embodiment of the invention. The fundamental structure of the second embodiment is identical to the first embodiment except for the reversed relationship between the roller 106 of the rack 105 and the tooth 104 of the pinion 107.

Between the rack 105 and the pinion 107, the pressurization is continuously exerted. The tooth profile of the pinion 107 is created based on a modified involute curve. The rack 105 has the rollers 106 rotationally supported by means of a bearing between a pair of parallel spaced side plates as intermeshing elements. A plurality of the rollers 106 are adapted to mesh concurrently with the corresponding teeth of the pinion 107.

Figure 11:
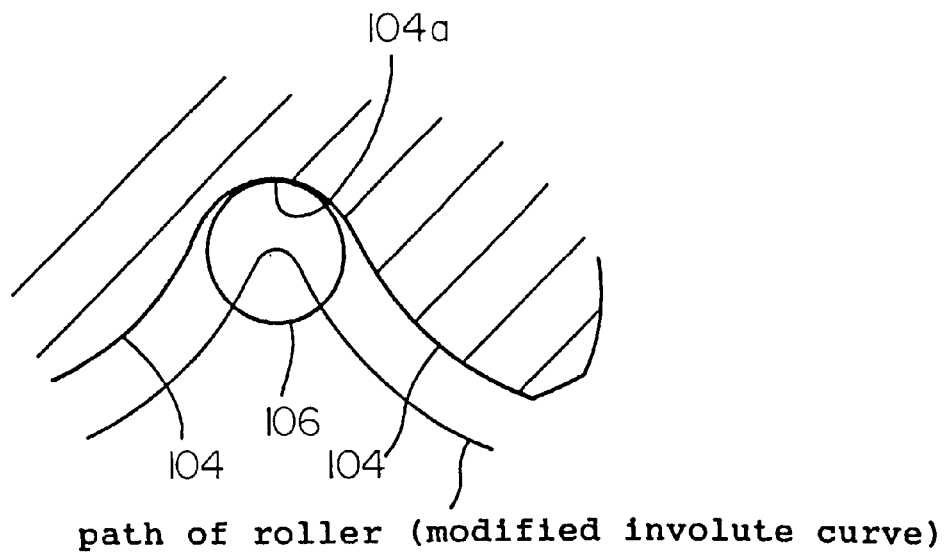
FIGS. 11 and 12 are explanatory views of an intermeshing portion between a roller and a tooth.

The tooth 104 of the pinion 107 profiled based on the modified involute curve has the proximal surface 104a between the neighboring teeth 104, 104. The radius of the proximal surface 104a is arcuated to be dimensionally greater than that of the roller 106 so that the roller 106 can maintain the rolling contact with the proximal surface 104a when the roller 106 meshes with the pinion 107. In concrete terms, the tooth profile of the pinion 107 forms a contour removed from the modified involute curve by the radius of the roller 106 as shown in FIG. 11. This is because a center of the roller 106 can trace the modified involute path when rolling along the teeth 104 of the pinion 7.

Figure 12:
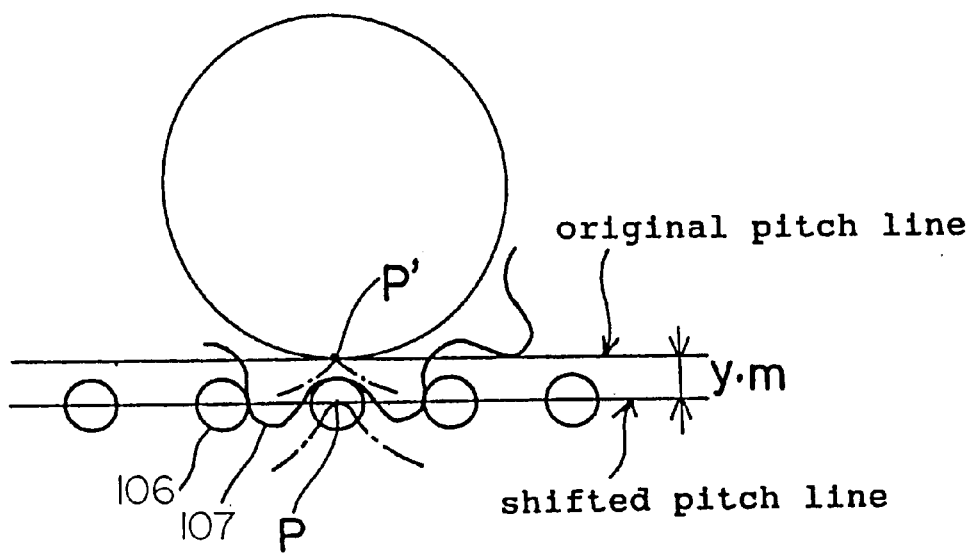

In detail, a pitch line of the rack 105 is shifted to be outside of the diameter (D) of the pinion 107 (positive profile shift (y·m)) as described in the first embodiment of the invention. As shown in FIG. 12, the positive profile shift makes the center of the roller 106 draw the modified involute curve P on the shifted pitch line although the center of the roller 106 draws the common involute curve P' on the original pitch line. The teeth 104 of the pinion 107 is profiled by a contour removed from the modified involute curve by the radius of the roller 106.

Figure 13:
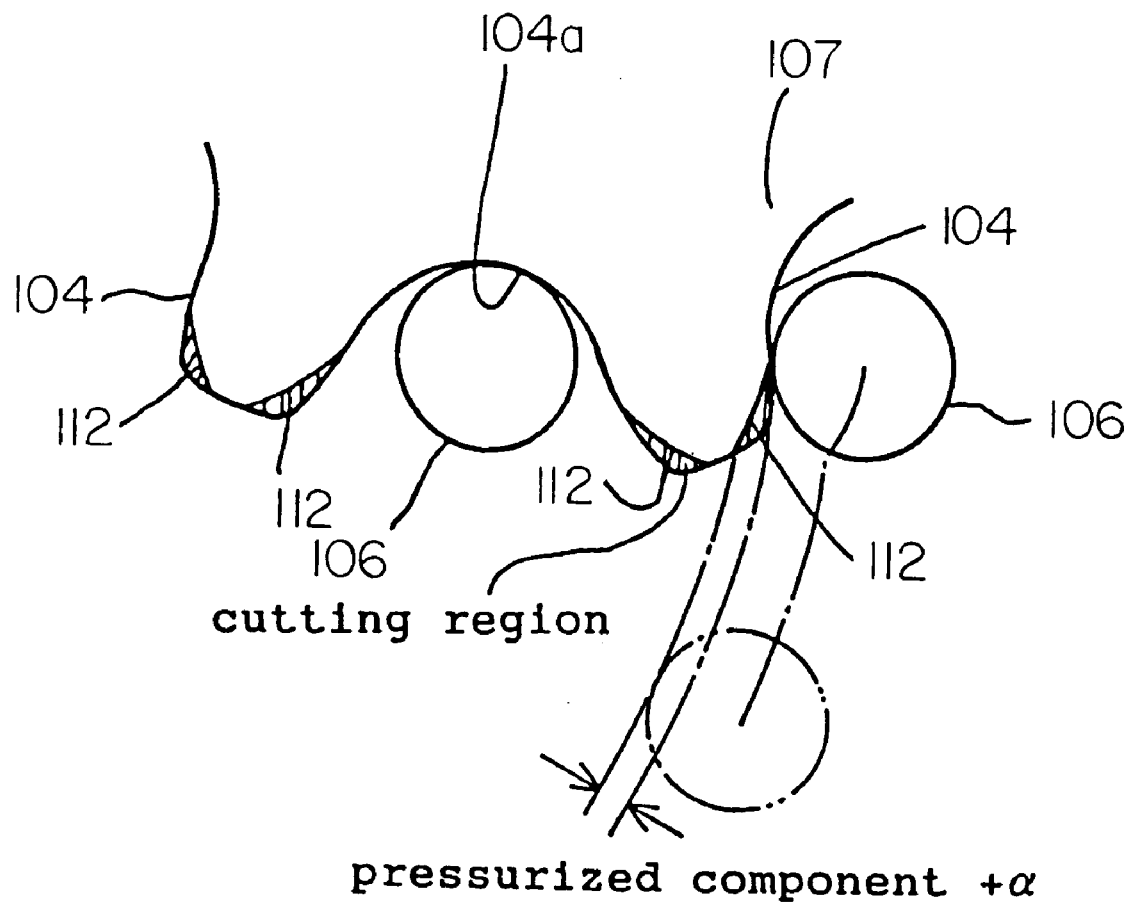
FIG. 13 is explanatory views of how a tooth profile are created.

As shown in FIG. 13, the approach profile 112 is provided on the tooth face of the pinion 107 in the manner to progressively be remote from the path of the roller 106 when the roller 106 rolls therealong. Fundamentally speaking, the second embodiment of the invention is directed to the transmission device 100 for converting torque between rotary and liner movement. Since the second embodiment is identical to the first embodiment except for the reversed relationship between the roller 106 of the rack 105 and the tooth 104 of the pinion 107, it is possible to achieve the same advantages as obtained by the first embodiment of the invention.

Figure 14:
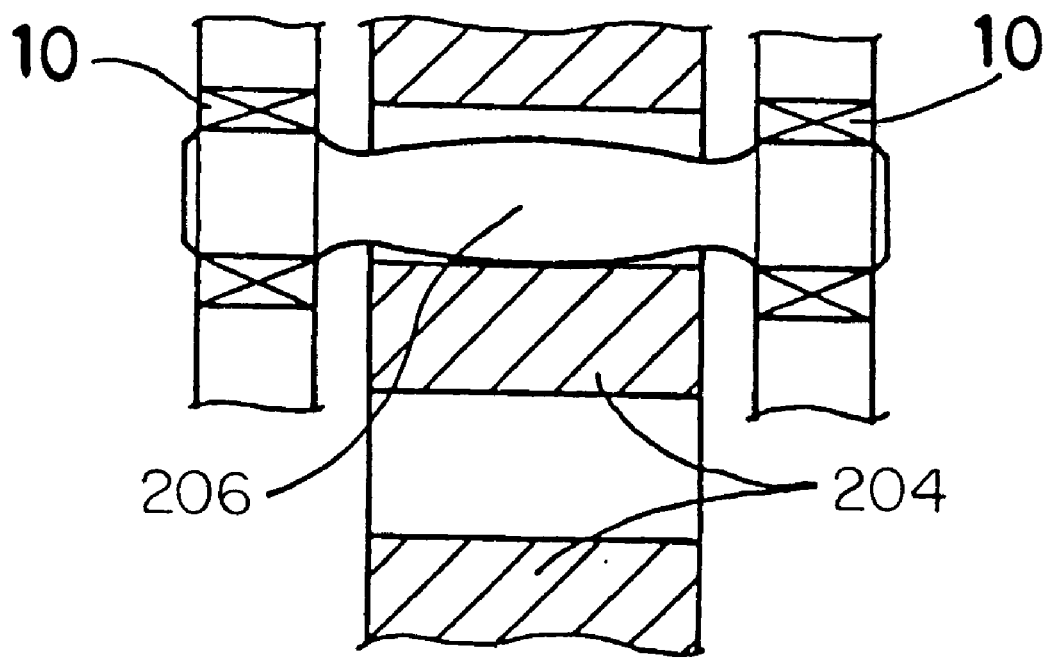
FIG. 14 is a longitudinal cross sectional view showing an intermeshing condition between a roller and a tooth according to a third embodiment of the invention.

FIG. 14 shows a third embodiment of the invention which is applicable to the first and second embodiment of the invention. In the third embodiment of the invention, the roller 206 is shaped into an ellipsoidal configuration so that the roller has a middle portion diametrically greater than both ends thereof. This makes it possible to smoothly mesh the roller 206 with a middle area of the tooth 204 even when the gradient occurs between the rack 5 and the pinion 7. This also attains the silent intermeshing movement during the torque transmission operation.

Machining the roller 306 into the ellipsoidal configuration has an advantage in that it is manufactured inexpensively with a high precision compared to crowning the tooth.

Figure 15:
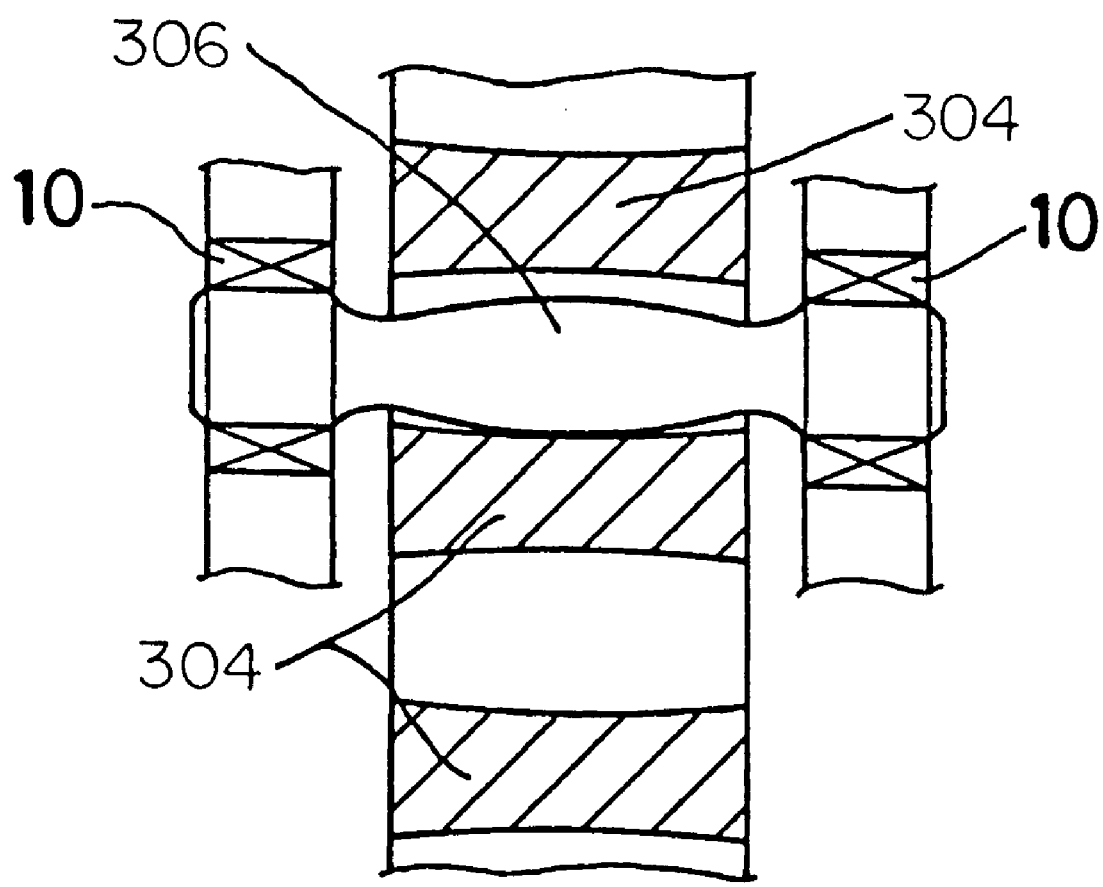
FIG. 15 is a longitudinal cross sectional view showing an intermeshing condition between the roller and the tooth according to a fourth embodiment of the invention.

FIG. 15 shows a fourth embodiment of the invention which is applicable when the roller 306 is shaped into the ellipsoidal configuration as the third embodiment of the invention. The tooth 304 is concavely crowned in the face width direction so that the crowning has a radius of curvature greater than the ellipsoidal roller 306. This increases the contact area between the roller 306 and the tooth 304 so as to significantly improve the torque transmission capability. This also reduces Herz stress so as to increase the durability of the roller 306 and the tooth 304.

Figure 16:
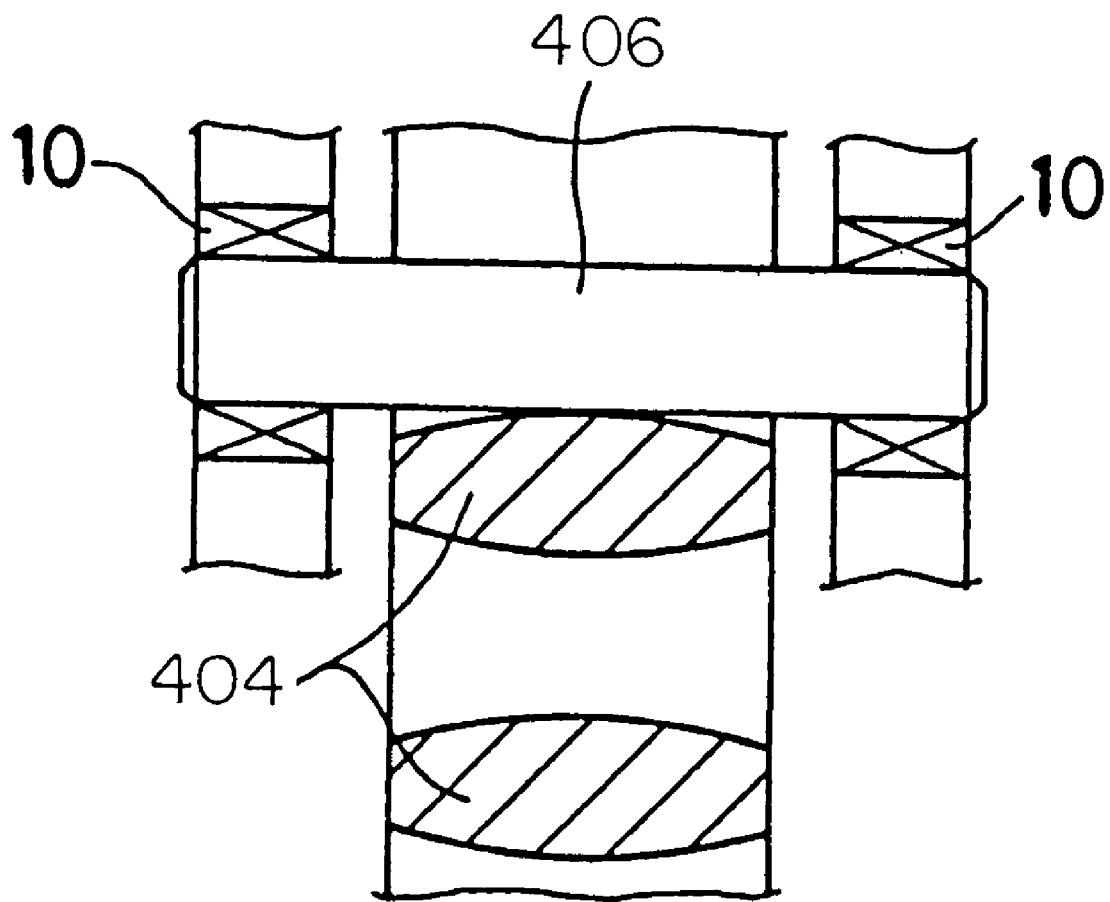
FIG. 16 is a longitudinal cross sectional view showing an intermeshing condition between the roller and the tooth according to a fifth embodiment of the invention.

FIG. 16 shows a fifth embodiment of the invention which is applicable to the first and second embodiment of the invention. In the fifth embodiment of the invention, the tooth 404 is convexly crowned in the face width direction. The roller is 406. The same advantages are obtained as attained by the third embodiment of the invention.

Figure 17:
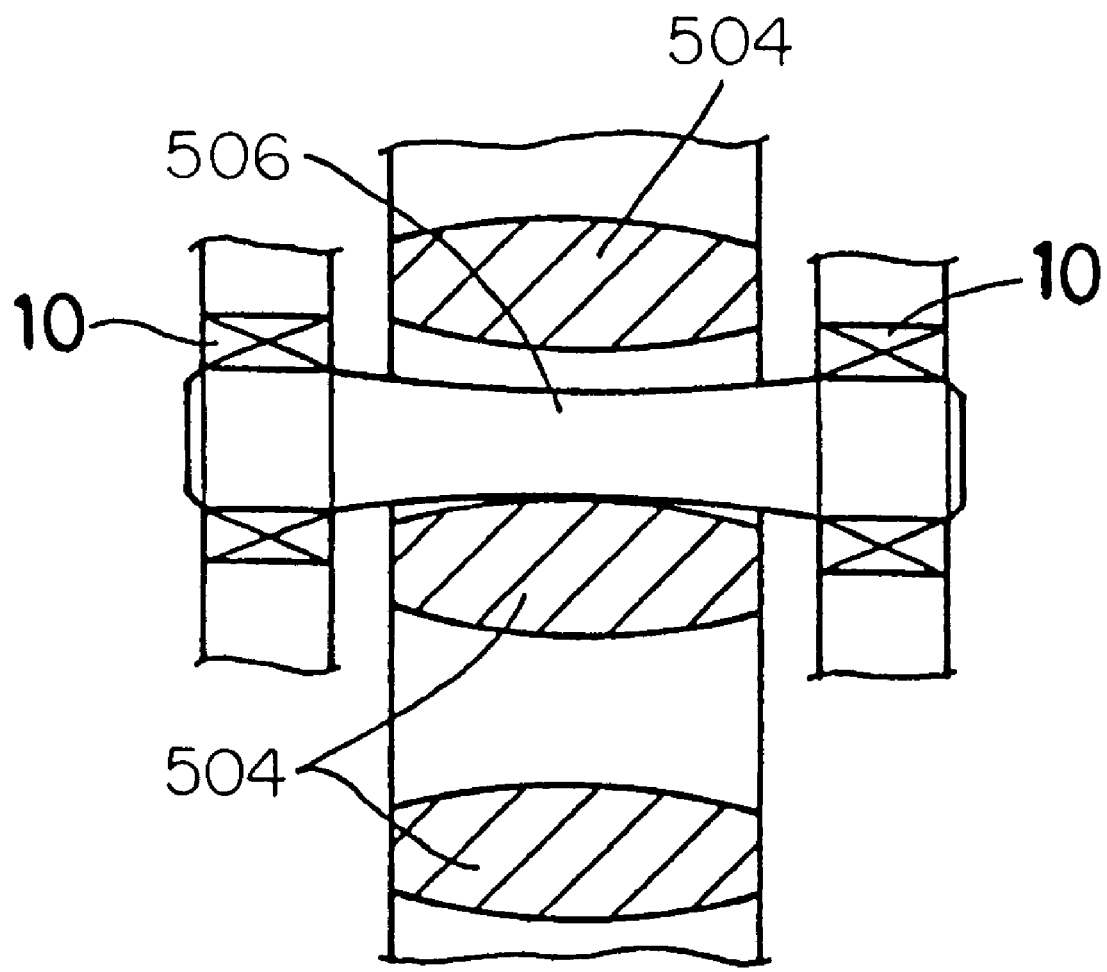
FIG. 17 is a longitudinal cross sectional view showing an intermeshing condition between the roller and the tooth according to a sixth embodiment of the invention.
Figure 18:
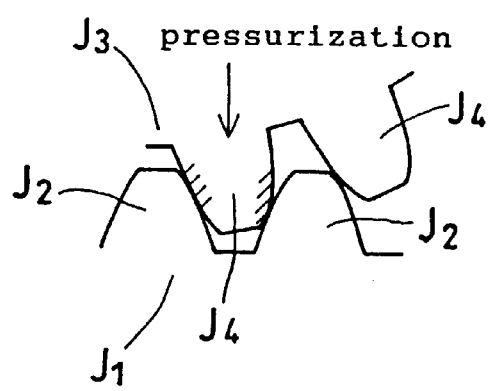
FIGS. 18 and 19 are explanatory views of an involute based tooth profile in a prior rack and pinion combination.
Figure 19:
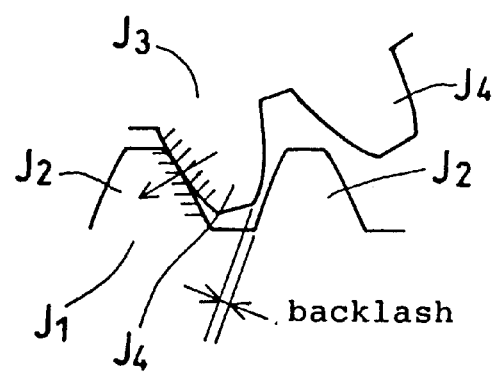
Figure 20:
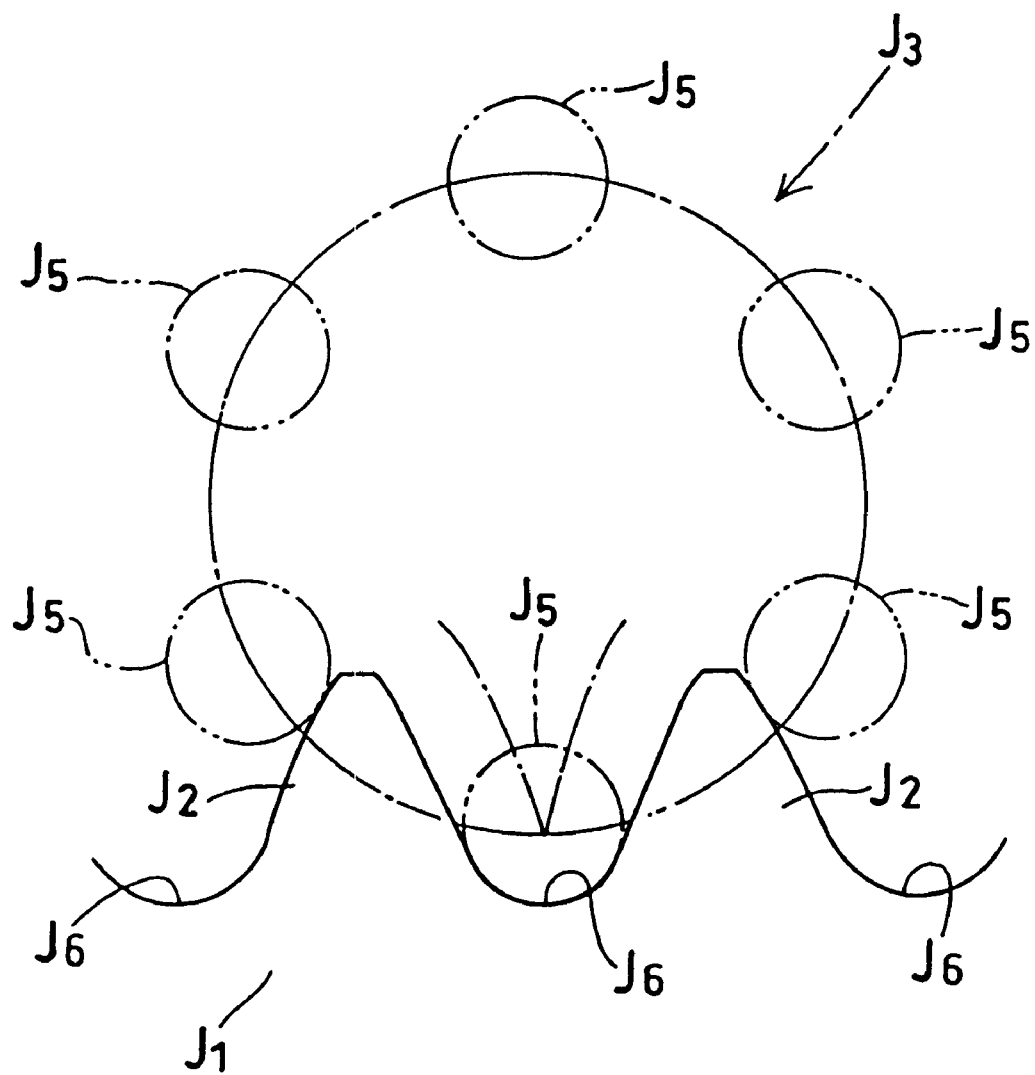
FIG. 20 is an explanatory view of a roller gear and cycloid-based gear in another prior rack and pinion combination.
Figure 21:
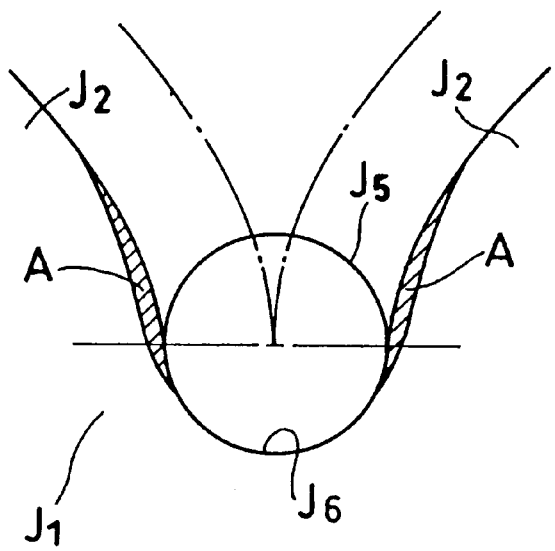
FIGS. 21 and 22 are explanatory views of an undercut (A) provided on a tooth flank in still another prior rack and pinion combination.
Figure 22:
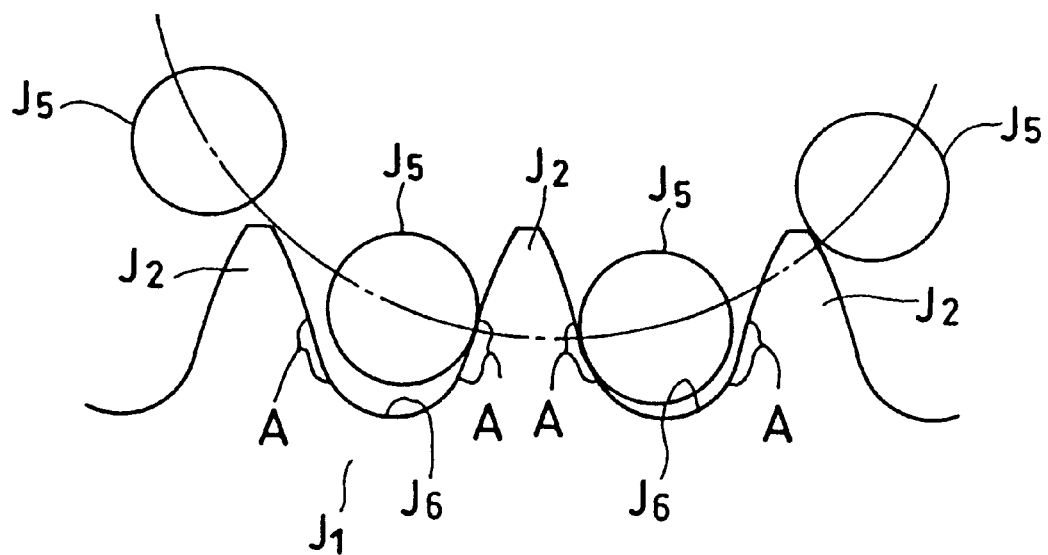
Figure 23:
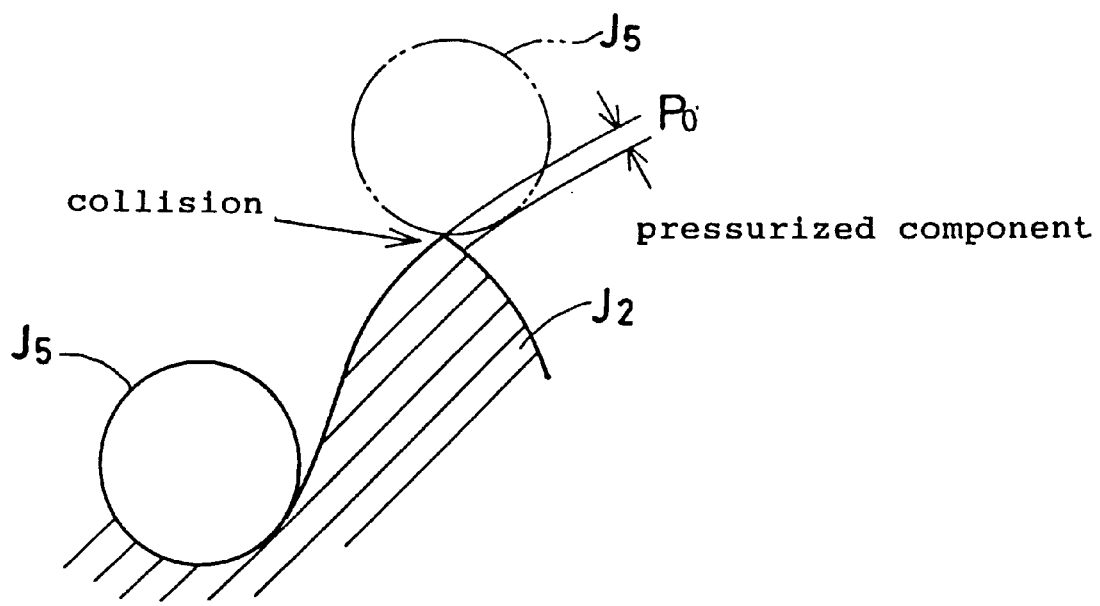
FIG. 23 is an explanatory view of tooth face profile in the prior rack and pinion combination.

FIG. 17 shows a sixth embodiment of the invention which is applicable when the tooth 504 is convexly crowned in the face width direction as described in the fifth embodiment of the invention. The roller 506 is shaped into a hyperboloidal configuration so that the roller has a middle portion diametrically smaller than both ends thereof. The hyperboloidal roller 506 has a radius of curvature greater than the convexly crowned tooth 504. The same advantages are obtained as attained by the fourth embodiment of the invention.

Modification Forms

It is to be noted that the number of the rollers 6 may be appropriately altered in accordance with the diametrical size of the pinion 7 and dimension of the rack 5.

It is further to be noted that the rack 5 and the pinion 7 may be made of iron, mild steel, wear-and friction-resistant plastic or ceramic material.

It is still further to be observed that a multitude of roulette lines are provided on an outer surface of the roller 6 in the lengthwise direction.

It is to be appreciated that a very thin layer of an elastic rubber coating may be provided on an entire outer surface of the roller 6 to increase a traction force when rolling along the tooth surface.

What is claimed is:

1. A torque transmission device including a rack having a plurality of teeth and a pinion having rollers to mesh with the teeth of the rack respectively, with pressurization provided therebetween, the torque transmission device comprising:

a bearing which rotationally supports each of the rollers on the pinion;

an arcuate tooth flank provided on the rack which is diametrically greater than each of the rollers of the pinion;

the rack having a tooth face which has an approach profile progressively moving away from a path of contact of each of the rollers along which each of the rollers would otherwise engage with the tooth face; and a plurality of each of the rollers of the pinion which concurrently mesh with each of the corresponding teeth of the rack.

2. A torque transmission device as recited in claim 1, wherein each of the rollers has a cylindrical shape.

3. A torque transmission device as recited in claim 1, wherein each of the rollers has an ellipsoid shape in which a middle portion is diametrically larger than both ends of each of the rollers.

4. A torque transmission device as recited in claim 3, wherein each of the teeth has a concave-shaped crowning surface in a face width direction, the crowning surface having a radius of each curvature greater than that of ellipsoidal roller.

5. A torque transmission device as recited in claim 1, wherein each of the teeth has a convex-shaped crowning surface in a face width direction in which a middle portion is wider than both ends of each of the roller.

6. A torque transmission device as recited in claim 5, wherein each of the rollers has a hyperboloidal shape in which a middle portion is diametrically smaller than both ends of each of the rollers, and each of the rollers has a radius of curvature greater than that of the convex-shaped crowning surface.

7. A torque transmission device including a pinion having a plurality of teeth and a rack having rollers to mesh with the teeth of the pinion respectively, with pressurization provided therebetween, the torque transmission device comprising:

a bearing which rotationally supports each of the rollers on the rack;

an arcuate tooth flank provided on the pinion which is diametrically greater than each of the rollers of the rack;

the pinion having a tooth face which has an approach profile progressively moving away from a path of contact of each of the rollers along which each of the rollers would otherwise engage with the tooth face; and a plurality of each of the rollers of the rack which concurrently mesh with each of the corresponding teeth of the pinion.

8. A torque transmission device as recited in claim 7, wherein each of the rollers has an ellipsoid shape in which a middle portion is diametrically larger than both ends of each of the rollers.

9. A torque transmission device as recited in claim 7, wherein each of the teeth has a convex-shaped crowning surface in a face width direction in which a middle portion is wider than both ends of each of the rollers.

* * * * *